3,681,018
IRON NITRIDE, FE₄N, AS A MATERIAL FOR MAGNETIC RECORDING AND METHOD OF MANUFACTURING SAME
Karl-Georg Knauff, Aachen, Germany, assignor to U.S. Philips Corporation, New York, N.Y.
No Drawing. Filed June 18, 1970, Ser. No. 47,591
Claims priority, application Netherlands, June 21, 1969, 6909541
Int. Cl. C01b 21/06
U.S. Cl. 23—191
3 Claims

ABSTRACT OF THE DISCLOSURE

It is proposed to use a powder of iron nitride, $Fe_4N$, consisting of rod-shaped particles and having a longitudinal axis of from 0.5 to 2 microns, which longitudinal axis is at least 5 times as long as the largest diameter of any cross-section of the particle in question at right angles to said axis, as a material for magnetic recording. The invention furthermore relates to a method of preparing such a powder. According to this method, a powder of iron oxide or iron oxide hydrate, the particles of which have approximately the same shape and dimensions as the above-mentioned iron nitride particles, is reacted in a fluid bed at a temperature between 350° C. and 400° C. with a mixture of hydrogen and ammonia. If desirable, the iron nitride formed is subsequently treated in the same fluid bed with a weakly oxidizing gas mixture so as to stabilize it, that is to say, deprive it of its pyrophoric properties.

---

It is known that the iron nitride, $Fe_4N$, is strongly ferromagnetic, see, for example, H. Nowotny, Zeitschrift für Elektrochemie 49, pp. 254–260 (1943) and W. A. J. J. Velge and K. J. de Vos, Zeitschrift für angewandte Physik, 21, No. 2, pp. 115–119 (1966).

According to the invention it has been found that this iron nitride, $Fe_4N$, in the form of rod-shaped particles having a longitudinal axis of from 0.5 to 2 microns, which longitudinal axis is at least five times as long as the largest diameter of any cross-section of the particle in question at right angles to the longitudinal axis thereof (hereinafter termed briefly the "diameter" of the particle) is very readily suitable as a material for magnetic recording.

The invention furthermore relates to a method of preparing the just-mentioned iron nitride, $Fe_4N$ suitable as a material for magnetic recording. According to this method, the starting material is a powder of iron oxide or iron oxide hydrate, which powder consists of particles of the same shape and dimensions as those of the above-mentioned particles of iron nitride, $Fe_4N$. According to the invention this powder is pseudomorphously reacted in a so-called "fluid bed," (German: "Wirbelschicht," French: "couche fluidifiée") with a mixture of ammonia and hydrogen at a temperature between 350° C. and 400° C.

A "pseudomorphous" reaction is to be understood to mean a reaction in which the particles of the starting material and those of the reaction product mainly have the same shape and dimensions, so in which each particle of the solid reacts individually with the gas and substantially maintains its shape and dimensions. Under the influence of a current of the hot gas with which the particles of the solid are to be reacted and which rises through a porous plate situated horizontally in a fluid bed furnace, the said particles of the solid form an undulating layer above said porous plate, which layer resembles a vehemently boiling liquid. The advantages of the fluid bed method for reacting finely divided solids with gases are numerous. Gaseous by-products of the reaction are rapidly conducted along by the rising gas and thus removed from the reacting mass. Furthermore, since a very efficacious heat transfer takes place in the fluid bed, the desirable conversion can be realised at a comparatively low temperature, so that it is possible in many cases to avoid or at least minimize sintering together of the particles of the solid.

It is to be noted that it was already known (see British pat. spec. 796,464) to prepare an iron powder consisting of rod-shaped particles by a topochemical reduction of a powder consisting of rod-shaped iron oxide particles and that it was likewise known (see French pat. spec. 1,422,638) to convert non-ferromagnetic iron oxide hydrate in a fluid bed furnace, into an iron oxide suitable as a material for magnetic recording.

The iron nitride $Fe_4N$-powders according to the invention are often highly pyrophoric, that is to say, that, as soon as they are exposed to the air, they are oxidized to iron oxide, while igniting spontaneously. According to a preferred embodiment of the method according to the invention of preparing said powders, the hydrogen-ammonia mixture which supports the fluid bed is gradually replaced by a weakly oxidizing gas mixture, for example, a gas mixture consisting of an inert gas, such as nitrogen or argon, with a little oxygen, after the chemical reaction in the fluid bed has terminated. By controlling the oxygen content of the weakly oxidizing gas mixture which now supports the fluid bed, the iron nitride $Fe_4N$ particles formed by the preceding reaction are coated with a stabilizing oxide layer so that they are no longer pyrophoric. In this connection it is to be noted that the stabilisation of finely divided, pyrophoric metal-containing catalysts by providing protective oxide films on the surfaces of the catalyst particles in a fluid bed is known from U.S. pat. spec. 2,565,347.

The following examples are illustrative of the invention.

Example I 20 gms. of a powder of α—FeOOH which has previously been dried by heating it at a temperature of 180° for 8 hours, and has partly been hydrated are transferred to a cylindrical furnace (diameter approximately 30 mms.) which is closed on the lower side by a porous plate of a ceramic material situated horizontally in the furnace. The α—FeOOH powder consists of rod-shaped particles, 1 micron long, 0.1 micron diameter. A mixture of equal parts by volume of hydrogen and ammonia is lead in a vertical upward direction through the porous plate for two hours at a temperature of approximately 380° C. and at a rate of approximately 3 litres per minute. In the fluid bed formed above the plate the α—FeOOH is converted pseudomorphously into iron nitride $Fe_4N$ particles of approximately the same shape and dimensions as those of the α—FeOOH particles from which was started. After completion of the reaction the iron nitride $Fe_4N$ power formed is immersed in dioxane while excluding air. After some time the powder is removed from the liquid and the adhesring residues of the liquid are removed. The properties of the powder determining the quality for magnetic recording were: saturation magnetisation $\sigma_s$, $2.0 \times 19^{-4}$ v. sec.m/kg.
$\sigma_r/\sigma_s$ (wherein $\sigma_r$ is the retentivity), 0.45
coercive force, $H_c$ 800 oersted.

Example II

In the same manner as described in Example I, iron nitride $Fe_4N$ is prepared by conversion of α—FeOOH with a mixture of hydrogen and ammonia. After completion of the reaction the current of the said gas mixture which supports the fluid bed and rises through the porous plate is replaced by a current of a gas mixture consisting of 99% by volume of nitrogen and 1% by volume of oxygen. The temperature of said gas mixture which now supports the fluid bed is 20° C. After leading through the above-mentioned gas mixture for 5 minutes it is gradually replaced by oxygen, in which the temperature of the fluid bed is not allowed to exceed 50° C.

The resulting iron nitride $Fe_4N$ powder is not pyrophoric and need hence not be stabilized by immersing in dioxane. The qualifications of this powder were the same as those of the powder prepared as described in Example I.

What is claimed is:

1. A powder of iron nitride $Fe_4N$ suitable as a material for magnetic recording and consisting of rod-shaped particles having a longitudinal axis of from 0.5 to 2 microns, which longitudinal axis is at least 5 time as long as the largest diameter of any cross-section of the particles in question at right angels to said axis.

2. A method of preparing rod-shaped particles of $Fe_4N$ suitable for magnetic recording and having a longitudinal axis which is at least 5 times as long as the largest diameter of any cross-section of the particles at right angles to said axis comprising the steps of heating a powder of $\alpha$—FeOOH consisting of rod-shaped particles having a longitudinal axis of from 0.5 to 2 microns in length, which longitudinal axis is at least 5 times as long as the largest diameter of any cross-section of the particles in question at right angles to said axis in a fluidized bed which is supported by a mixture of hydrogen and ammonia at a temperature between 350° C. and 400° C.

3. A method as claimed in claim 2, wherein subsequent to the conversion in the fluid bed in which iron nitride $Fe_4N$ is formed the last-mentioned substance is stabilised in the same fluid bed by heating it at the same place where the above-mentioned conversion took place at a temperature between 20° C. and 50° C. in a fluidized bed which is supported by a mixture of an inert gas and oxygen.

References Cited

UNITED STATES PATENTS

| 2,565,347 | 8/1951 | Bremmer et al. | 252—459 |
| 2,872,292 | 2/1959 | Altmann | 23—191 |
| 3,352,638 | 11/1967 | Perlowski et al. | 23—200 |

FOREIGN PATENTS

| 796,464 | 6/1958 | Great Britain | 23—191 |
| 1,135,812 | 12/1968 | Great Britain | 23—191 |
| 1,142,228 | 2/1969 | Great Britain | 23—191 |

OTHER REFERENCES

Handbook of Chemistry and Physics, 51st edition, section B, page 99 (Chemical Rubber Co. 1970).

OSCAR R. VERTIZ, Primary Examiner

C. B. RODMAN, Assistant Examiner

U.S. Cl. X.R.

274—41.4